United States Patent [19]

Descléve et al.

[11] 3,896,247

[45] July 22, 1975

[54] THERMAL SHOCK PROTECTION FOR REFRACTORY MATERIAL SUBJECT TO MOLTEN METALS

[75] Inventors: Pierre Descléve, Bures sur Yvette; Jean-Claude Mégnin, Fontenay aux Roses, both of France

[73] Assignee: Groupement Atomique Alsacienne Atlantique, France

[22] Filed: Feb. 5, 1974

[21] Appl. No.: 439,786

[30] Foreign Application Priority Data
Feb. 9, 1973 France .............................. 73.04667
Apr. 16, 1973 France .............................. 73.13733

[52] U.S. Cl. ...................... 428/65; 428/64; 428/66; 428/131; 428/134; 428/136; 428/157; 428/192; 428/212; 428/218; 428/542
[51] Int. Cl.².... B32B 1/04; F16J 15/00; B32B 3/14
[58] Field of Search ....... 161/42, 44, 109, 110, 117, 161/118, 139, 147, 149, 182; 264/60, 62; 65/43; 417/50; 266/43

[56] References Cited
UNITED STATES PATENTS 3,242,239 3/1966 Schafer et al.................. 264/137 X
3,505,158 4/1970 Murray............................... 161/110
3,542,489 11/1970 Von Starck........................ 417/50
3,552,533 1/1971 Nitz................................... 161/42 X
3,656,867 4/1972 Carbonnel et al.................. 417/50
3,712,428 1/1973 Marin............................ 264/60 UX FOREIGN PATENTS OR APPLICATIONS
1,040,846 9/1966 United Kingdom

*Primary Examiner*—George F. Lesmes
*Assistant Examiner*—Alan T. McDonald
*Attorney, Agent, or Firm*—Sughrue, Rothwell, Mion, Zinn & Macpeak

[57] ABSTRACT

Method and device for protection against thermal shocks on refractory materials which are not very conductive, such as ceramic substances, intended to be brought repeatedly into contact with very corrosive melted substances such as aluminium. Slots having no great depth, rounded off at their ends, are formed at the surface of the substances put into contact with the molten metals. Those slots are stuffed with compacted ceramic fibres which are impermeable to the molten metals. Application is to the protecting of the body of conduction pumps immersible in liquid aluminium.

14 Claims, 2 Drawing Figures

PATENTED JUL 22 1975

3,896,247

THERMAL SHOCK PROTECTION FOR REFRACTORY MATERIAL SUBJECT TO MOLTEN METALS

BACKGROUND OF THE INVENTION

1. Field of the Invention

The present invention concerns a method for forming surface structures for protection against repeated thermal shocks to which the surface of any part placed in a discontinuous way in close contact with a fluid medium brought to a high temperature is subjected. The present invention also concerns the surface structures thus produced.

2. Description of the Prior Art

It is known, indeed, that when a block of ceramic material having high surface fracture energy, a low coefficient of heat expansion, a low coefficient of heat conductivity, a slight modulus of elasticity and a low Poisson's ratio, is immersed in a fluid medium brought to a high temperature as in a molten aluminium bath, for example, there immediately occurs a very great rise in temperature limited to a thin film of the surface of the said block. By reason of the inherent properties of the material defined above, that film thickens only slowly whereas the remainder part of the internal mass of the ceramic block continues to keep its original temperature. Under the action of heat, that film of ceramic substance tends to expand, but as it forms an integral part of the ceramic block, it cannot move away therefrom; it is therefore subjected to a compression which may reach an extremely high figure. Likewise, when the body is removed from the fire when brought to a high temperature and immersed in a medium at a substantially lower temperature, there occurs firstly a surface cooling which causes traction efforts limited to the outer layer to appear. It is known that these repeated compression and traction efforts give rise to cracks. That phenomenon is evidently all the more noticeable as the material used is less conductive and that its resistance to compression or to traction is slighter. This will be more particularly the case for parts made of refractory material which is a poor conductor, a ceramic substance, for example. This will also be the case with devices coated with a ceramic material, used in the treating and handling of molten metals, in which the very refractory material which is a poor conductor fulfills the function of a thermal protection means. In that case, the resistance to traction efforts of that material is particularly low and the cracks form fairly easily when the device is retracted from the liquid metal.

It is also known that such problems arise in other circumstances, more particularly in the case of heating up of certain metallic tools and that a solution has been provided by tracing in the surface part of the tool, slots enabling the reducing of the surface traction and compression efforts.

It is also known that in other cases, more particularly in the producing of thermal shields, the portion of the surface of the material to be protected which is subjected to heating up is covered with noncontiguous sublimable strip plates.

SUMMARY OF THE INVENTION

The protection method prefected by the inventor resides in a combination of means comprising a first means close to the technique set forth above, which consists in producing a structure not contiguous with the surface of the part to be protected formed either by fixing strip plates or by opening up the artificial layer of the part to be protected by regularly spaced slots.

A second means consists in stuffing the gap comprised between two neighbouring elements with a material which may be defined by the qualities which it should comprise: be sufficiently compressible so as not to allow extra tensions to be generated, be impermeable to the fluid medium brought to a high temperature in order to avoid any retention of that fluid medium. Such substances exist in the trade in the form of felt tissues or glass wool products of alumina or of other refractory fibres.

A third means consists in ending each of the slots previously constituted in the ceramic material boring.

Slots formed according to the first means described hereinabove, filled in according to the second abovementioned means, make it possible to reduce the tensions in very great proportions. Nevertheless, when a ceramic substance has been immersed in the very hot molten metal bath, the front of the thermal wave is propagated in the ceramic substance; the orginal very hot film thickens on propagating in the ceramic mass in the direction of the core and finally reaches the level of the bottom of the slot after a generally fairly long time, depending on the type of ceramic substance and naturally on the depth of the slot. The front of the thermal wave is then no longer as stiff as at the instant when a first surface film of ceramic substance was brought at a high temperature and the internal stresses which it causes have become more progressive so that the dangers of destruction of the material are more reduced; nevertheless, the bottom of the slots constitutes a discontinuity which may cause further tensions to be generated. That is why the third means consisting in ending the slot by a cylindrical boring makes it possible, each time that this is necessary, to cancel the forming of a discontinuity of the tensions in the bottom of the slot. There are, however, certain structures in which the latter means, although being desirable, cannot be implemented.

The object of the invention is therefore a method for protecting the surface of refractory materials which are poor heat conductors immersed repeatedly in a very hot corrosive fluid medium such as molten aluminium, hence subjected to repeated thermal shocks, and the improvement consists in:

Forming, on the surface of the said materials, structures of non-contiguous elements, having a slight thickness and being separated by grooves; Stuffing those grooves with a material which is more compressible than the refractory material to be protected, not permeable to the said fluid medium.

A first embodiment of the method which is the object of the invention combining the first two means listed hereinabove consists in cutting out from the mass of refractory material surrounding the protected part, regularly spaced out grooves possibly completed by a second network of grooves perpendicular to the preceding grooves to define polygonal surfaces separated by grooves. These grooves are filled in according to the invention with wool or felt made of very thin compacted refractory fibres.

A second embodiment of the method according to the invention again combining the first two means listed hereinabove consists in covering the smooth surfaces of a refractory part with non-contiguous strip plates, formed out of a refractory material which is possibly less compact than the basic material and hence having lower heat conductivity. These strip plates are connected to the basic refractory material with by a coating formed by moulded refractory fibres, joined together by a inorganic binding agent and a ceramic binding agent in the form of a liquid or a paste. The groove formed by the gap between the strip plates is filled in as in the preceding embodiment by means of a wool fabric of felt fabric made of refractory fibres. That stuffing ensures, here, a double protection: on the one hand, it prevents the hot fluid from coming into thermal contact with the subjacent layer and on the other hand, it prevents the contact of that fluid with the coating which fixes the strip plates and which may possibly react in contact with the fluid used.

A third embodiment of the method which is the object of the invention consists in combining the three means listed hereinabove and in cutting out from each ceramic element to be treated against thermal shocks one or several families of slots according to the nature of the surfaces to be protected, then in forming again the appropriate borings at the end of the slot placed the nearest to the core; lastly, filling in the slots and the drillings with a stuffing by means of wool or felt made of refractory fibres.

In certain cases, it will appear to be greater advantage to determine simply the slot by a more or less distinctly rounded part more particularly in order not to weaken the mechanical strength of the part, while reducing in substantial proportions the appearance of a zone of discontinuity at the bottom of the slot.

The scope of the invention will be better understood on referring to the following description by way of an example having no limiting character and showing the various embodiments explicitly set forth hereinabove applied to the particular case of a conduction pump immersed in a metal which in particularly reactive in the liquid state such as aluminum, with reference to the drawings.

DESCRIPTION OF PREFERRED EMBODIMENTS

It is known that conduction pumps for corrosive liquid metals in which the pump body, made of a refractory material, is formed by a certain number of elements in the form of cores through which the duct of the liquid metal passes and in which are arranged various recesses for the magnetic circuits. These cores made of refractory material ensure the protection of the magnetic circuits against the corrosive action of the molten metals and make it possible to keep the magnetic circuits below their Curie point because of the poor heat conductivity of the refractory materials chosen.

Figure 1:
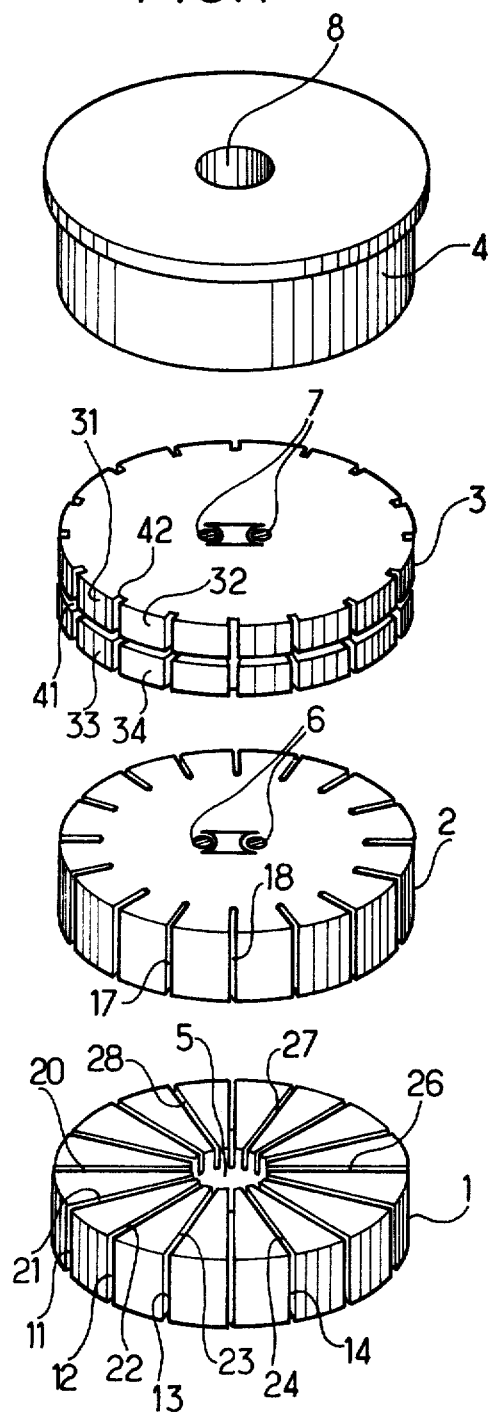
FIG. 1, is a diagrammatic perspective view of the outside surface of the body of a condition pump seen from the front, treated according to the first two embodiments of the invention mentioned hereinabove.

In this way, seen from outside, the body of such a pump resembles a stacking of several cores of refractory material such as shown in FIG. 1, where all the internal parts except for the vertical duct for the liquid metal have been systematically omitted from the drawing.

FIG. 1 shows the successive cores made of refractory ceramic material 1, 2, 3, 4, forming the body of the pump in which only the elements of the duct for the molten metal have been shown by portions 5, 6, 7 and 8 of the latter.

The lower core 1 in contact with the molten metal by its base and by its lateral face undergoes a treatment on its lateral face, and on its base.

That core 1 has been tilted in order to allow th slots formed in those two faces concerned better to be seen. It will be seen that radial slots such as 20, 21 . . . 28 are formed on the base. These slots end at the duct 5 which they open up to a certain depth. On the lateral face of the core 1, which is also in contact with the liquid metal, slots such as 11, 12, 13, 14 which extend the slots 20, 21, . . . 28 formed on the base are produced so that all the slots are radial.

The core 2 bears, on its lateral face, slots 17, 18 etc. These slots are also radial. The upper face and the lower face of that core do not come into contact with the liquid metal. These faces therefore do not have slots.

The lateral slots of these two cores are rounded at their end and in order to prevent the forming of a zone of discontinuity.

According to the second embodiment of the method according to the invention, strip plates formed preferably from a refractory product which is substantially more compacted than the basic material but having preferably the same coefficient of expansion are made to adhere to the surface of the refractory part.

In FIG. 1, such strip plates have been laid on core 3. They are shown at 31, 32, 33, 34, etc., separated by grooves 41, 42, etc.

The strip plates are constituted in the present case by a ceramic substance having the same composition as the ceramic substance coating the pump, but having a lighter density and consequently having insulating properties greater than that of the ceramic substance of the pump body, as well as a greater resistance to thermal shocks than that of the basic material. Indeed, the mechanical properties of these strip plates are not so good as that of the ceramic part which supports them, but these plates only fulfill a thermal protection function; therefore, they do not need to have any particular mechanical qualities. The cementing of these strip plates is obtained very simply by dividing fairly finely a mixture of alumina and silica fibres and incorporating in a known way an inorganic binding agent and a ceramic binding agent in the form of a paste or a liquid. Such a binding agent does not, however, always resist in a satisfactory way the action of very corrosive molten metals.

It is therefore indispensable, whatever embodiment may be chose, to fill in the grooves or the slots and the borings with a product impermeable to the molten metals and which may, moreover, be easily compressed so as not to resist the extension of the external layer thus tilted.

Figure 2:
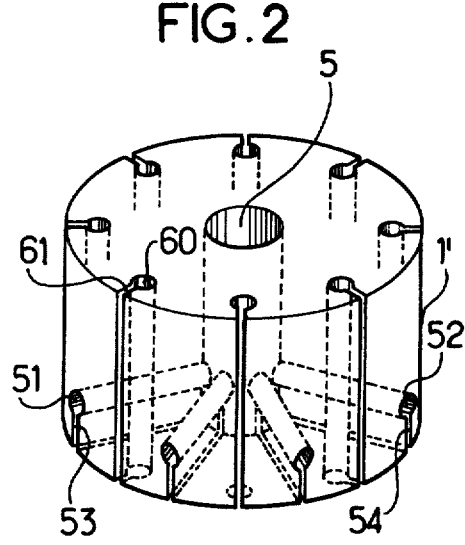
FIG. 2 is a perspective view of the bottom core of a pump body treated according to the third embodiment of the invention.

FIG. 2 shows once again the lower core 1' in its normal position, whereas in FIG. 1, it has been tilted. In that figure, that lower core 1' has been treated according to the third embodiment which makes it possible to reduce even more greatly, if necessary, the tensions after a thermal shock.

The two faces which are subjected to the contact with the molten metal are the same as in the preceding case: the lateral face and its base shown, this time, at the bottom of the core, since the latter is set out in its normal position.

Radial borings such as 51, 52, etc., are performed, being connected up to the central funnel 5. These borings are then extended towards the base in permanent contact with the molten metal by slots such as 53, and 54. In this way, the slots 53, 54, etc., are ended by radial borings ensuring the protection of the core against mechanical expansion efforts due to the heat which is propagated from the base of the pump towards the top thereof.

The lateral protection of the core 1' is provided as previously in FIG. 1 by vertical borings such as 60, parallel to the axis of the pump, extended outwards by slots such as 61.

These two families of borings and slots are preformed symetrically in the core 1, each boring parallel to the axis being performed in the bisecting plane of the dihedral formed by the two slots such as 53 and 54.

That arrangement in which each slot is stopped by a cylindrical duct ensures a distribution of the internal tensions such that cracking becomes really improbable.

As previously, the slot and the borings are filled in by means of a substance impermeable to molten metals.

A solution affording a great advantage consists in using a mixture known per se of alumina and silica fibres available in trade in the form of felt or of wool, with which the slots, the borings and the grooves are stuffed. Such stuffing is not wetted by the said liquid metal. The liquid metal therefore does not enter the slots and deos not come into contact with the lower layer of ceramic substance.

Thus, the complete protection of the pump is provided, whatever embodiment may be adopted.

Repeated experiments which would have resulted in complete cracking of the block without that surface structure were then able to be performed on the blocks thus treated by the three embodiments described hereinabove. A ceramic block thus treated has been immersed suddenly for 60 minutes in the liquid aluminium then suddenly removed and cooled by a flow of air for 60 minutes. That operation was repeated 50 times without the least modification in the structure of the ceramic block appearing.

Although the devices which have just been described appear to afford the greatest advantages for implementing the method according to the invention, applied to the particular case of the protection of the molten ceramic coating of the pump bodies immersed in the corrosive molten metals, it will be understood easily that various modifications may be made to the method without going beyond the scope of the invention in the case of various particular problems, it being possible to replace certain of the elements implemented by others capable of ensuring the same technical function therein.

We claim:

1. In a refractory material structure for repeated immersion in a very hot and corrosive fluid medium such as molten aluminum, the improvement wherein said element comprises a block of refractory material having at least one network of slots within the surface thereof and a material stuffing within said slots which is more compressible than the refractory material to be protected and nonpermeable to said fluid medium.

2. The refractory material structure as claimed in claim 1, wherein: strip plates having substantially the same composition as the block of refractory material and having lower density, are carried by said block of refractory material on the surface thereof and are separated by grooves stuffed with said non permeable, compressible material.

3. The structure according to claim 1, wherein, slots extend inwardly from the surface of said block and terminate in enlarged diameter cylindrical borings.

4. The structure according to claim 1 wherein, each slot terminates at its end remote from the surface of the block in a cylindrical boring whose axis is parallel to the plane of the slot.

5. The structure according to claim 1, wherein the compressible stuffing material, impermeable to the fluid to be treated is constituted by very thin and compacted refractory fibers.

6. The structure according to claim 3, wherein the refractory material implemented is a ceramic substance and the compressible material impermeable to the liquid comprises compacted alumina fibers.

7. The structure according to claim 6, wherein the compressible material impermeable to the molten metal is constituted by a mixture of thin alumina fibers and of thin silica fibers.

8. The structure according to claim 2, wherein the refractory block is formed by a ceramic substance and the strip plates are adhered to said block of ceramic substance by means of a paste product formed by a finely divided mixture of refractory fibers subsequently bound by means of an inorganic binding agent and of a ceramic binding agent.

9. The structure according to claim 7, wherein the mixture of finely divided ceramic fibers comprises alumina fibers.

10. The structure according to claim 9, wherein the mixture of finely divided ceramic fibers comprises silica fibers.

11. The structure according to claim 8, wherein the incompressible and impermeable material stuffing the grooves between the strip plates is constituted by fine compacted refractory fibers.

12. The structure according to claim 11 wherein the ceramic fibers comprise alumina fibers and silica fibers.

13. The structure according to claim 4 wherein the refractory material is in the form of a substantially circular cylinder for coming into contact with a liquid metal along the said lateral surface, and wherein protection is ensured by a network of radial slots, each ending in a cylindrical bore whose axis is parallel to the axis of revolution of said cylinder of refractory material.

14. The structure according to claim 13, wherein a network of radial slots leads out onto the base of said cylinder and ends in cylindrical bores whose axes are contained in a plane parallel to said base.

* * * * *